Nov. 7, 1967     J. G. CODINA     3,351,146
AUTOMATIC ELECTRONIC MICROGRAM SCALE
Filed May 16, 1967     2 Sheets-Sheet 1

INVENTOR
JORGE G. CODINA

United States Patent Office 3,351,146
Patented Nov. 7, 1967

3,351,146
AUTOMATIC ELECTRONIC MICROGRAM SCALE
Jorge G. Codina, 233 Secor Road,
Hartsdale, N.Y. 10530
Filed May 16, 1967, Ser. No. 638,862
9 Claims. (Cl. 177—210)

ABSTRACT OF THE DISCLOSURE

An electronic scale adapted for manual or automatic weighing of small fixed or varying quantities of material, as measured for example in micrograms, as well as measuring rates of change of weight of such small varying quantities.

Summary of the invention

My scale includes an electromagnet adapted to produce a levitational magnetic field directed downward therefrom. First means is coupled to the electromagnet to energize same. The first means is responsive to a variable feedback signal to vary the intensity of the levitational magnetic field. The field intensity varies monotonically with variations of the feedback signal, increasing when the feedback signal increases, and decreasing when the feedback signal decreases.

A magnetic body having a material receiving cavity is positioned below the electromagnet, being simultaneously subject to the upward lift of the levitational magnetic field and the downward pull of the oppositely directed total weight of the body and its contents.

Weight indication means, rendered responsive when the body is positioned within a predetermined vertical control zone spaced apart from and positioned below the electromagnet, generates an output signal which depends upon the vertical position of the body within the zone and varies with changes in this position. This position is determined by the total weight of the body and its contents and changes as this total weight changes.

Second means coupled between the indication means and the first means obtains the feedback signal from the output signal. The feedback signal is supplied to the first means to control the intensity of the levitational magnetic field. The feedback signal produces an increase in the field intensity when the total weight increases and produces a decrease in the field intensity when the total weight decreases; the effect of these variations is to prevent the body from moving upward or downward out of the zone.

Since the field intensity must increase or decrease as the total weight increases or decreases in order to maintain the body in the zone (i.e. the levitational force of the field must always be approximately equal to the downward pull of the total weight of the body), the field intensity is a monotonic function of the total weight. Hence, read out means can convert the field intensity to a direct reading of the weight. Moreover, since the feedback signal must increase or decrease with increases or decreases in the weight, the feedback signal is also a monotonic function of the weight; read out means can derive from the feedback signal a direct reading of the changes in total weight as well as indicate the rate at which the total weight is changing.

By suitable calibration, the weight of the total body without material can be disregarded and a direct reading can be obtained of the weight of material in the body cavity as well as the rate at which the weight of material in the cavity is changing.

My scale has much higher sensitivity and accuracy then heretofore obtainable in scales measuring weight in micrograms. Moreover, my scale can have a much faster rate of response to changes in weight than conventional scales, since unlike conventional scales, my scale requires no air, oil or other damping action which retards the rate of response. My scale is extremely small, compact and light in weight; it can be moved easily and rapidly from place to place; it utilizes only one movable part which is virtually indestructible; it requires little or no adjustment during and after use and it easily calibrated.

Detailed description of preferred embodiments

Figure 1:
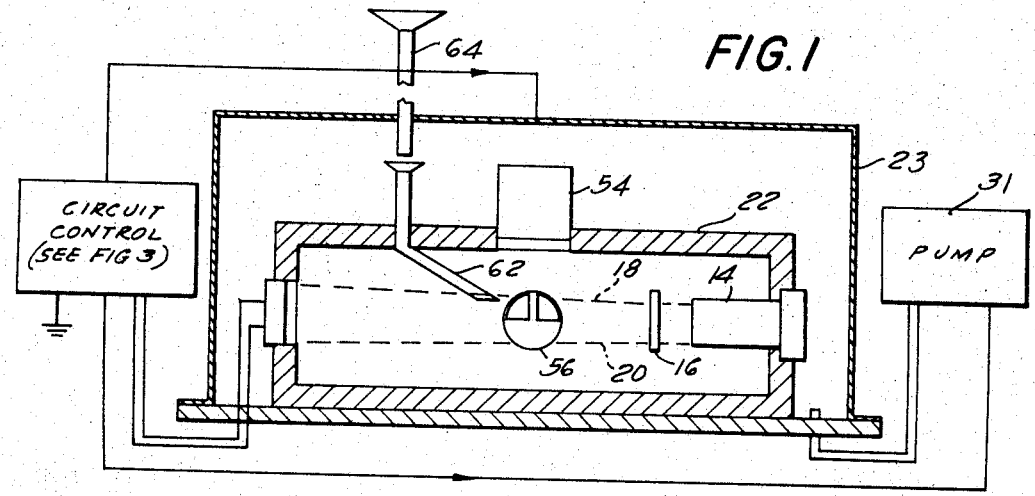
FIG. 1 is an enlarged cross sectional detail view of certain parts in my scale.
Figure 2:
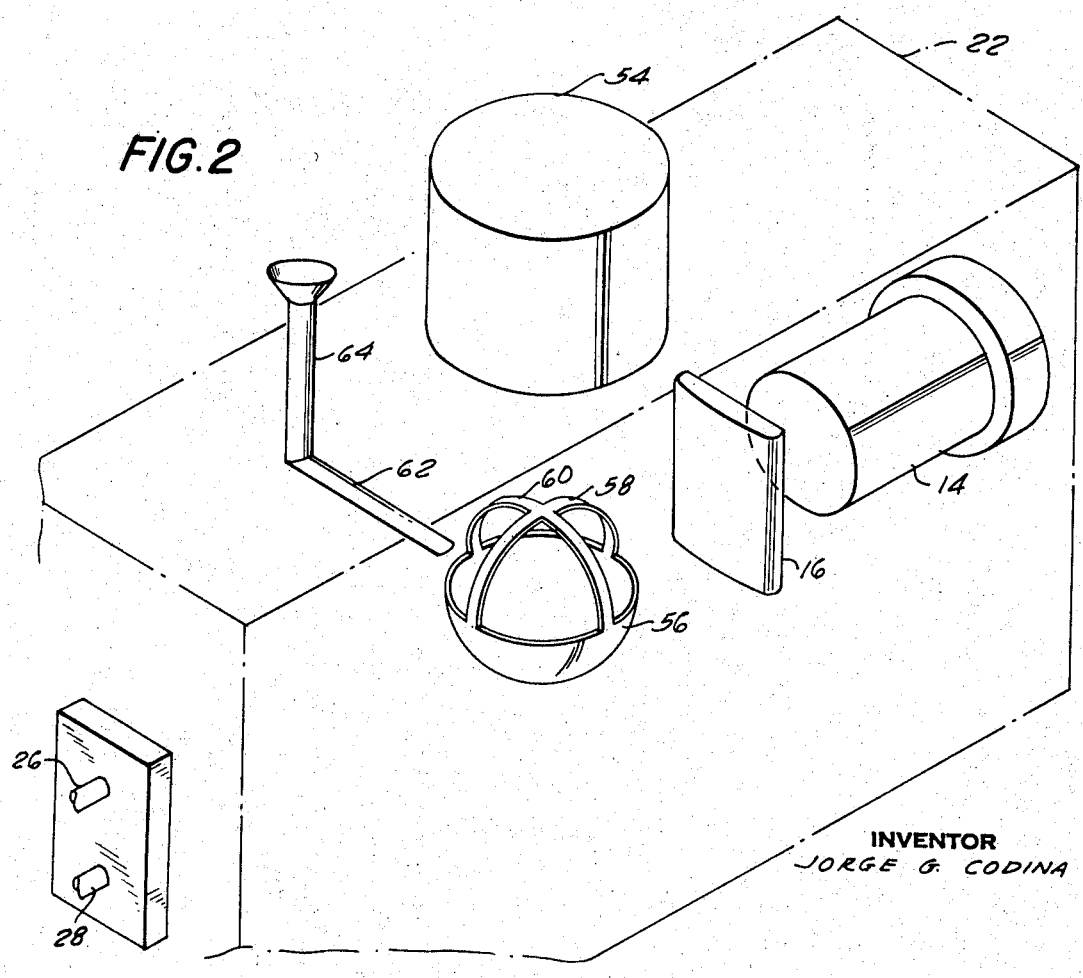
FIG. 2 is another enlarged perspective detail view of certain parts of my invention.
Figure 3:
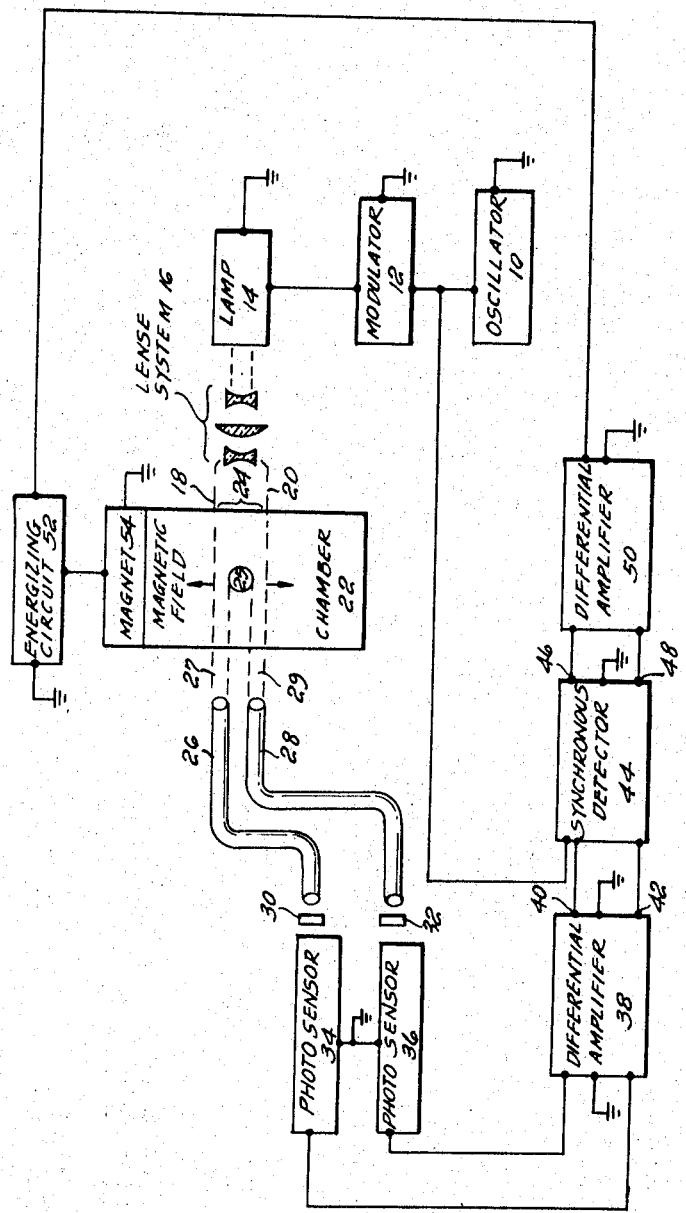
FIG. 3 is a block diagram of one form of my invention.

Referring now to FIGS. 1–3, a magnetic body 25 is disposed within a transparent non-vacuum tight chamber 22. Chamber 22 is disposed in a larger chamber 23 connected to vacuum pump 31. The body 25 comprises a downwardly extending lower hollow hemisphere 56, the top opening of which is spanned by orthogonal straps 58 and 60. These straps would be coincident with a topwardly extending upper hemisphere of the body if it were present. A hollow feed tube 62 open at both ends extends inclinedly downward with the bottom end disposed between and spaced apart from the straps and slightly above the top opening of hemisphere 56. The upper end of tube 62 is connected to the bottom end of a hollow material feed conduit 64 extending out of the chamber. Micrograms of solid material to be weighed, carried in a liquid vehicle, are fed through conduit 65 and tube 62 through the top opening of hemisphere 56 into the interior thereof. The flow of material is controlled by an on-off valve (not shown) which is quick acting, manually or automatically controlled and disposed external to the chambers. The vacuum in the chamber, augmented, if necessary, by heat drives off the vehicle leaving the material in situ in the hemisphere. I prefer to turn the vacuum pump on as soon as the flow of materials stops and to cut the pump off when the material flow starts. The material can be introduced automatically at periodic intervals if desired. A light source 14 mounted in one side of chamber 22 directs light through lens and filter system 16 past body 25 onto one end of each of two flexible light pipes or conduits 26 and 28.

An oscillator 10 produces an oscillatory signal of constant frequency. This signal is supplied to the input of modulator 12 which actually functions as a chopper to interrupt the signal at a constant rate. The interrupted signal is then supplied to light source 14 of narrow bandwidth (which is substantially monochromatic) whereby pulsating light is emitted from the source. This pulsating light impinges upon lens system 16 which converts the incident light into a thin ribbon shaped beam of light lying in a vertical plane and having upper and lower horizontal edges 18 and 20. This beam passes horizontally through the chamber 22 whereby the upper and lower edges respectively define the upper and lower bounds of a vertical control zone 24 within the chamber. Body 25 is positioned in the chamber in the path of the beam because of the levitational action described in more detail hereinafter. As the beam strikes the body, the beam is split into two beams of variable width, the first beam 27 having upper horizontal edge 18 and a lower horizontal edge coincident with the top of the body, the second beam 29 having an upper horizontal edge coincident with the bottom of the body and a lower horizontal edge 20. Each of these beams impinges upon one end of the corresponding flexible light pipe or conduit 26 or 28. (The conduits constitute a fiber optics system.)

After each of the beams 27 or 29 has passed through the other end of the corresponding pipe 26 or 28, it passes through a corresponding one of the two identical narrow band optical filters 30 or 32 (matched with the bandwidth of the light beams) and impinges upon a corresponding one of matched photosensors 34 or 36, whereby a separate electrical signal is produced at the output of each photosensor.

Since each light beam is modulated, each photosensor output signal is an alternating signal. These two photosensor signals are fed to the input of an alternating current differential amplifier 38. As a result, an alternating differential signal appears between the output terminals 40 and 42 of amplifier 38. A synchronous detector 44 is connected at a first input to terminals 40 and 42 to receive the alternating differential signal and is also connected at a second input to the output of oscillator 10 to receive the oscillatory signal. The resultant detector signal produced across output terminals 46 and 48 of detector 44 is supplied to the input of a direct current differential amplifier 50. The resultant signal appearing at the output of amplifier 50 is supplied to the input of energizing circuit 52. The output of circuit 52 is fed to electromagnet 54 positioned on top of chamber 22. Electromagnet 54 produces a levitational magnetic field which extends downwardly into the chamber 22 past zone 24. This field exerts a levitational action on body 25 which counterbalances the downward pull of the total weight of the body whereby the body is held within zone 24.

For the purpose of clarity, the conventional power supply as well as the conventional connections between the supply and the various electrical units shown in the drawings have been omitted and will not be referred to herein.

*Operation of my scale*

The amplitude of each photosensor output signal is dependent upon the width (as measured in the vertical plane) of the corresponding beam from which the corresponding photosensor derives its output signal. When the photosensors 34 and 36 are exactly matched, the two photosensors output signals are identical, and the alternating differential signal (which represents the difference between the two photomultiplier output signals) is zero. Further, when the alternating differential signal is zero, the detector signal is also zero and, as a result, the feedback signal is zero. This condition only exists when there is no body present in the path of the light beam. When the body is present, the differential signal is proportional to the total weight of the body and the resultant feedback signal acts to automatically maintain the body in the zone.

However, as the weight of the body increases, for example, when the body is charged with material, the body is pulled downward since its total weight now slightly exceeds the oppositely directed force produced by the field. At this point, the width of beam 27 is increased and the width of beam 29 is decreased. The resultant inequality of photosensor output signals produces an alternating difference signal having an instantaneous magnitude determined by the relative beam widths. This signal, after detection yields a detected signal of a given polarity. The resultant direct feedback current then causes a decrease in the energizing current, decreasing the levitational field strength, thereby again restoring the body to its original position. The current developed to center the body, and the levitational field produced by the electromagnet, each represent electrical or electromagnetic equivalents of the total weight of the body, and a suitably calibrated current or field sensitive device can be used to provide a direct read out of total weight. A recorder can be connected to this device to provide a suitable record. Similarly, the changes in the current producing the field when supplied to such a read out device properly calibrated, can be used to produce readings representing the changes in total weight as such changes occur.

Alternatively, the two photosensors can be deliberately unbalanced, as for example, through the use of conventional biasing techniques, to produce a difference signal which increases or decreases from a null (but not zero) reading, thus moving the body from its position.

In order to obtain maximum sensitivity, accuracy and speed of response, my scale requires an evacuated chamber. The presence of air produces undesirable errors because of temperature changes, buoyancy, damping and the like. However, my scale will operate in the same manner as previously described in the presence of air, provided that the resultant decreases of an order of magnitude in sensitivity, accuracy and speed of response of the scale can be tolerated by the user. Under these conditions, the material to be weighed can be introduced as before or can be introduced in solid form by the use of tweezers or the like.

While I have described my invention with particular reference to the drawings, many variations and modifications within the scope and sphere of my invention will be obvious to those skilled in the art, and my protection is to be limited only by the terms of the claims which follow.

What is claimed is:

1. A scale comprising:
    (a) an electromagnet adapted to produce a levitational magnetic field directed downward therefrom;
    (b) first means coupled to said electromagnet to energize same and being responsive to a variable feedback signal to vary the magnetic field intensity, the intensity varying monotonically with variations of said feedback signal;
    (c) a magnetic body having a material receiving cavity, said body being positioned below said magnet and being subject both to the levitational force of said field and to the downward pull of the total weight of the body including the weight of any material in the cavity;
    (d) weight indication means rendered responsive when said body is positioned within a predetermined vertical zone spaced apart from and positioned below said electromagnet to generate an output signal varying with changes of vertical position of said body within said zone produced by changes of the total weight of the body;
    (e) second means coupled between said indication means and said first means to obtain said feedback signal from said output signal and to supply said feedback signal to said first means, said feedback signal increasing said field intensity when said total weight increases and decreasing said field intensity when said total weight decreases to prevent said body from escaping from said zone, the magnetic field intensity being a monotonic function both of the total weight of the body as well as the weight of any material in the cavity.

2. A scale as set forth in claim 1 further including third tubular feed means disposed adjacent but above said body to introduce said material into said cavity.

3. A scale as set forth in claim 1 further including an evacuated chamber, said body being positioned in said chamber.

4. A scale as set forth in claim 1 wherein said body is a hollow lower hemisphere open at its top end, the interior of said hemisphere forming said cavity.

5. A scale as set forth in claim 1 wherein said indication means includes a device for producing a ribbon of light lying in a vertical plane, the upper and lower edges of this ribbon respectively defining the upper and lower bounds of said vertical zone.

6. A scale as set forth in claim 1 wherein said body has a lower hemisphere open at its top end, the hemisphere being spanned by two orthogonal semicircular straps lying in vertical planes, the opposite ends of each strap being secured to opposite points at the top end of the hemisphere, the interior of the hemisphere forming said cavity.

7. A scale as set forth in claim 1 wherein material to be weighed dispersed in a liquid vehicle is fed through the feed means into the body cavity.

8. A scale as set forth in claim 1 wherein said body is disposed in a non-vacuum tight chamber.

9. A scale as set forth in claim 1 wherein said body is disposed in a first relatively small non-vacuum tight chamber which in turn is disposed in a larger evacuated chamber.

References Cited

UNITED STATES PATENTS 2,559,919 7/1951 Gustafsson.
3,089,553 5/1963 Gast.

FOREIGN PATENTS 588,624 12/1959 Canada.

ROBERT S. WARD, JR., *Primary Examiner.*